May 15, 1928.
I. M. BRANDJORD
1,670,186
WINDMILL
Filed Feb. 21, 1925
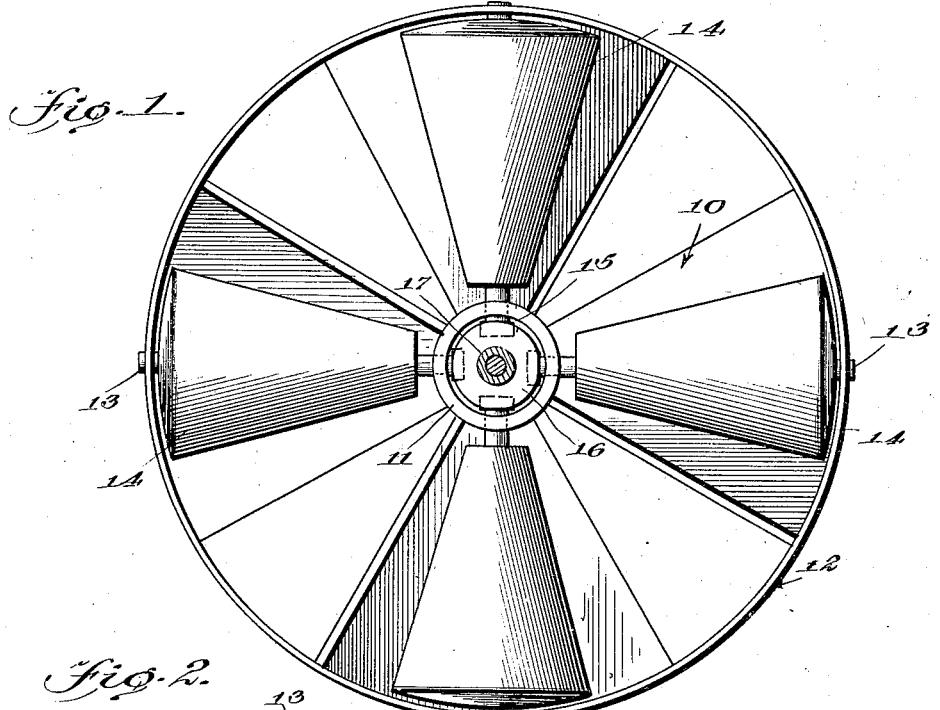
Fig. 1.
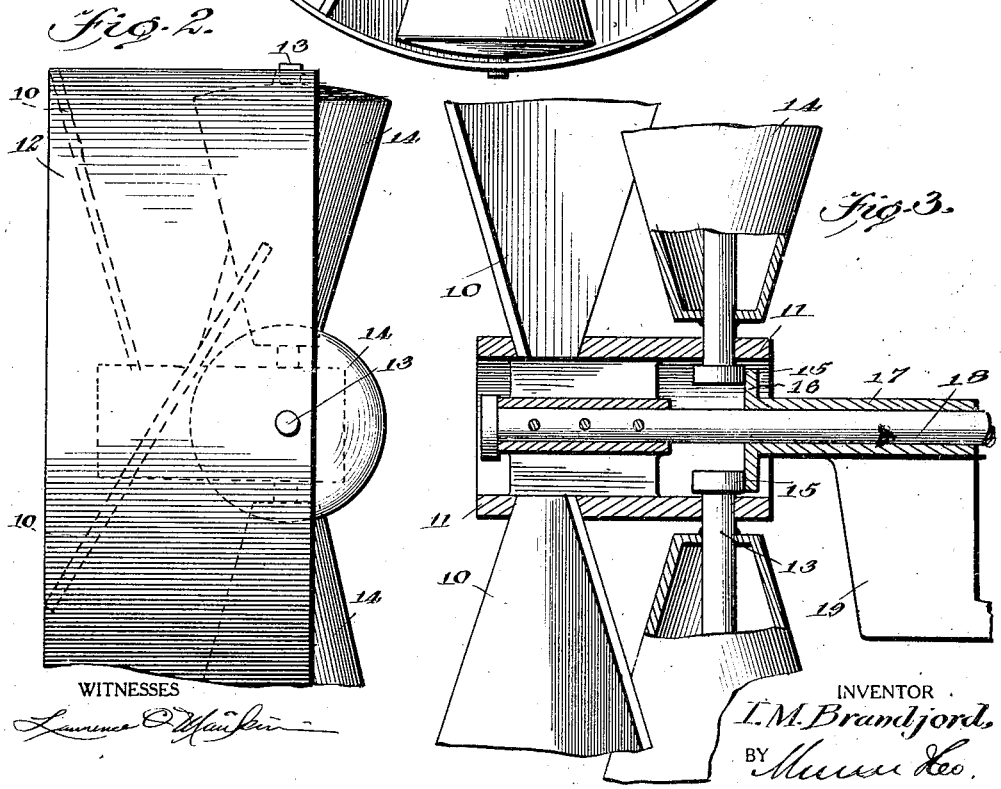
Fig. 2.
Fig. 3.
INVENTOR
I. M. Brandjord,
BY
ATTORNEYS Patented May 15, 1928.

1,670,186

UNITED STATES PATENT OFFICE.

IVER M. BRANDJORD, OF RONAN, MONTANA.

WINDMILL.

Application filed February 21, 1925. Serial No. 10,905.

My present invention relates generally to air motors, and more particularly to air motors of the type usually employed in connection with windmills, my object being the provision of certain additions and improvements which will have the effect of greatly increasing the amount of power delivered in all kinds of winds and also of enabling the wind wheel to operate in much lighter winds than structures now in use, by rarifying the air on that side of the blades and rotating members in which the wind wheel rotates, thus eliminating back pressure against the blades and the rotating members and in its place producing the suctional power resulting from a partial vacuum.

In the accompanying drawing which illustrates my present invention and forms a part of this specification, Figure 1 is a sectional rear elevation of a wind wheel constructed in accordance with my invention;

Figure 2 is a partial top plan view thereof, and,

Figure 3 is a vertical section taken centrally through a portion of the wind wheel and the supports immediately adjacent thereto.

Referring now to these figures, my invention proposes a wind wheel of the type in which the blades or vanes 10 radiate from a hub 11 and are connected at their outer ends by a ring 12. In accordance with my invention both the hub 11 and the outer ring 12 are formed of such width as to not only provide for the proper support of the blades or vanes 10, but also permit of the proper bearing for the outer and inner ends of the shafts 13 of a series of truncated cones 14, one disposed in the rear of each of the blades or vanes 10, preferably with the axes of the cones 14 parallel to the radii of the wings or blades 10.

The outer ends of the shafts 13 have bearing in the ring 12, while the inner ends of these shafts are extended rotatably into the hub 11 in which the inner shaft ends have cylindrical enlargements 15 in engagement at one side with a friction disk 16 secured to or integral with the adjacent portion of the bearing 17 of the windmill shaft 18 to a portion of which the hub 11 is securely fastened beyond the bearing 17. This bearing 17 may for instance form part of a supporting bracket or head 19 mounted to rotate upon a vertical pivot not shown so that it may in practice revolve at the upper end of the wind mill frame.

The wind wheel blades or vanes are so disposed that they will rotate the wheel in the same direction that the truncated cones revolve, viewing the wind wheel from the wind side, or front. The wind wheel set in motion by the action of the wind upon the blades or vanes, but as soon as it begins to rotate, each of the cones 14 will be rotated with its axis during its revolutions with the revolving wind wheel. The speedy rotation of the cones, on their axes, tends to create a vacuum on that side of the blades and rotating members in which the wind wheel is moving. This vacuum tendency, constantly created, will not only eliminate back pressure against the blades and rotating members, but will also create a suctional or pulling power on the blades and rotating members in the direction of the movement of the wind wheel. There is also a tendency to air compression or pushing on the opposite side of the blades and rotating members. The rotating members themselves become powerful propellers in addition to the increased power they deliver to the blades.

By utilizing these rotating members radially in the wind wheel and at the rear of the vanes or blades, I thus greatly increase the amount of power delivered by the wind wheel in any wind and enable it to operate in lighter winds than structures now in use. They also decrease "end thrust" on the wind wheel shaft.

I claim:—

1. A wind wheel including radial blades or vanes, and rotatable power elements supported thereby and rotatable upon axes approximately parallel to, and at the rear of, the blades or vanes, and means for rotating said elements on their said axes during the revolution of the wind wheel, as described.

2. A wind wheel including radial blades, an inner hub and an outer ring to which the blades are connected, and a series of radially disposed rotatable members having bearing in the said hub and ring, said members being arranged at the rear of the blades, and means for rotating the said members during revolution of the wheel.

3. A wind wheel including radial blades, rotatable power elements having their axes approximately parallel with, and, at the rear of, said blades and having inwardly projecting shafts provided with cylindrical enlargements, and supports for the wind wheel including a member having a stationary friction disk in engagement with the said cylindrical enlargements whereby to rotate said power elements during revolution of the wind mill.

4. A wind wheel including an inner hub and an outer ring, radial blades extending between the hub and ring, a series of radially disposed truncated cones, each disposed at the rear of one of said blades, said cones having axial shafts rotatably mounted at their outer and inner ends in said ring and hub, and having inner cylindrical enlargements, a shaft on which the hub is mounted, and a support for the shaft including a stationary disk with which the said cylindrical enlargements of the cone shafts are in contact.

5. A revoluble device of the character described having in combination, a shaft, a hub thereon, radial blades attached thereto, and a series of radially disposed rotatable bodies having bearings in said hub, said bodies being arranged at the rear of the blades, and means for rotating said bodies during revolution of said device.

IVER M. BRANDJORD.